J. A. CRAWFORD.
NUT LOCK.
APPLICATION FILED JULY 20, 1911.
1,035,691.
Patented Aug. 13, 1912.
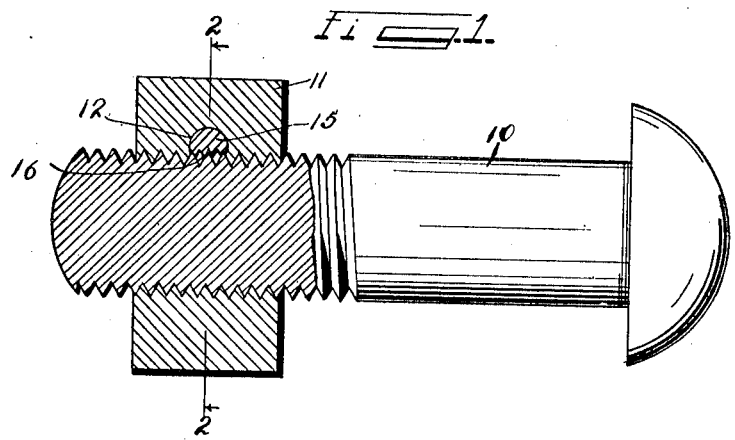
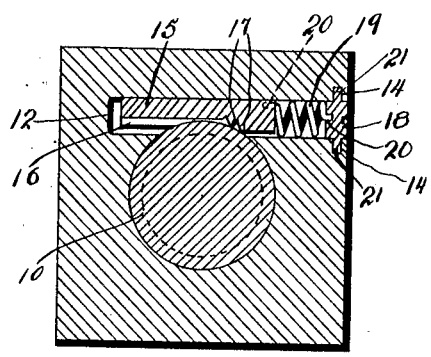
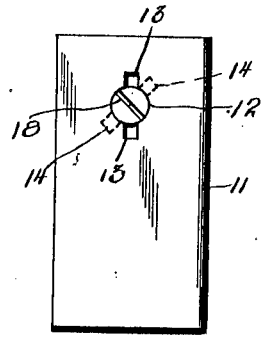
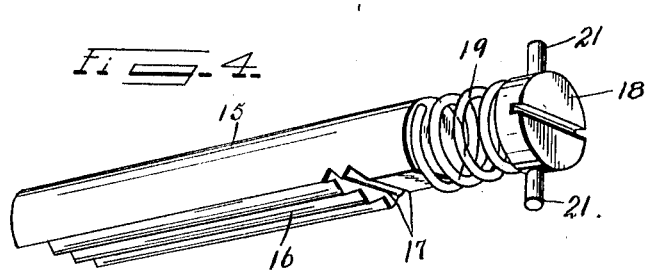
Witnesses
Inventor
J. A. Crawford.
By
Attorneys

UNITED STATES PATENT OFFICE.

JAMES A. CRAWFORD, OF YORK, NEBRASKA.

NUT-LOCK.

1,035,691.   Specification of Letters Patent.   Patented Aug. 13, 1912.

Application filed July 20, 1911. Serial No. 639,628.

*To all whom it may concern:*

Be it known that I, JAMES A. CRAWFORD, a citizen of the United States, residing at York, in the county of York, State of Nebraska, have invented certain new and useful Improvements in Nut-Locks; and I do hereby declare the following to be a full, clear, and exact description of the invention, such as will enable others skilled in the art to which it appertains to make and use the same.

This invention relates to nut locks and has for an object to provide a device of this character that will automatically lock upon being screwed to final position upon a bolt, a novel locking pin being provided which will not resist tightening tendency of the nut but will positively prevent backing off of the nut.

A further object of the invention is to provide a nut lock in which the nut is provided with a key opening that opens through but one side of the nut, and is closed at its mouth by a novel cap, this construction positively preventing accumulations of foreign matter gaining access to the opening.

With the above objects in view the invention consists in certain novel details of construction and combination of parts hereinafter fully described and claimed, it being understood that various modifications may be made in the minor details of construction within the scope of the appended claims.

In the accompanying drawing forming part of this specification:—Figure 1 is a side elevation of a bolt equipped with my improved nut lock the latter and portions of the bolt being shown in section. Fig. 2 is an enlarged cross sectional view taken on the line 2—2 Fig. 1. Fig. 3 is a side elevation of the nut lock. Fig. 4 is a detail perspective view of the locking pin.

Referring now to the drawing in which like characters of reference designate similar parts, 10 designates a bolt of ordinary character, and 11 a nut threaded thereon and equipped in one side with a circular opening 12 which extends nearly to the opposite side of the nut and registers with the bolt opening in the nut as shown in Fig. 2.

Alined slots 13 are formed in the nut and register with the opening 12, these slots receiving the locking lugs of the pin which will be hereinafter described. Furthermore on opposite sides of these slots are arranged slots 14 which extend radially from the opening 12 but do not open out through the face of the nut, these slots forming sockets or seats for the reception of the lugs when the pin is in operative position.

The locking pin 15 is substantially cylindrical in outline, and one face of the pin is flattened and provided with longitudinal ribs 16. The pin is substantially three-quarters around and the smooth rounded side of the pin is designed to bear against the inner wall of the opening 12 while the ribs 16 engage between the valleys of the bolt threads as clearly shown in Fig. 2.

By referring to Fig. 1 it will be noted that the ribs 16 do not bind against or mutilate the threads of the bolt but are of sufficient size to frictionally engage the threads of the bolt so that when the nut is rotated in either direction upon the bolt, the pin will be moved in an opposite direction through the instrumentality of its frictional engagement with the bolt threads.

Formed on the ribbed face of the pin are a plurality of threads or ratchet teeth 17, these teeth intersecting the ribs. Since the pin moves in a direction counter to the direction of rotation of the nut, it will be seen by referring to Fig. 2 that when the nut is rotated in a counter-clockwise direction upon the bolt that the pin will move to the left and will disengage the ratchet teeth from the bolt threads so that the nut may be readily tightened to final position. On the other hand when an attempt is made to rotate the nut in a clockwise direction, the pin, through the instrumentality of the frictional engagement of the ribs with the bolt threads, will be moved to the right, and in this movement of the parts, the ratchet teeth will be brought into binding engagement with the threads of the bolt and movement of the nut prevented.

For holding the pin in operative position, a disk cap 18 is formed of sufficient size to form a closure for the opening 12, and this cap is connected to the pin through the instrumentality of a helical spring 19, the terminals of which are engaged in suitable openings 20 formed in the confronting faces of the cap and pin. The cap is further provided in its opposite sides with lugs 21 which are of sufficient size to enter the above mentioned slots 13, the lugs entering the slots against the tension of the spring 19 and after a slight rotation is imparted to the cap, the lugs will be forced back by the spring into the above mentioned seats 14 in which position of the parts the cap is locked against disengagement from the nut.

It will be noted that since the opening 12 does not open through opposite sides of the nut, and further since the cap 18 forms a closure for the open end of the opening, that dust and other foreign matter cannot gain access to the opening 12 and impede the proper working of the locking pin. The helical spring furthermore is by virtue of the lugs of the cap anchored at one end to the nut, the spring serving to hasten the ratchet action of the pin since the spring will store up energy as the pin is moved in the direction of the cap during a clockwise rotation of the nut to return the pin to its operative position upon cessation of such rotation.

What is claimed, is:—

1. The combination with a bolt, of a nut adapted to screw thereon, said nut having an opening in one side registering with the bore of the nut and extending to nearly the opposite side of the nut, a pin slidingly fitted in said opening and having longitudinal ribs on one side engaging between the threads of said bolt, said pin further having transverse ratchet teeth intersecting said ribs, a cap mounted within and forming a closure for the open end of said opening, and a helical spring connecting said cap and said pin and serving to maintain said ratchet teeth in engagement with said bolt threads.

2. The combination with a bolt, of a nut adapted to screw thereon, said nut having an opening in one side registering with the bore of the nut and extending to nearly the opposite side of the nut, said nut face having alining slots registering with said opening, said nuts being further provided interiorly with slots registering with said opening and forming seats, a pin slidingly fitted in said opening and having longitudinal ribs on one side engaging between the threads of said bolt, and further having transverse ratchet teeth intersecting said ribs, a cap forming a closure for said opening and having oppositely disposed lugs seated in said seats, and a helical spring connecting said cap and said pin and operating to maintain said ratchet teeth in engagement with said bolt threads.

In testimony whereof, I affix my signature, in presence of two witnesses.

JAMES A. CRAWFORD.

Witnesses:
S. H. MAGILL,
J. C. CHURCHILL.

---

Copies of this patent may be obtained for five cents each, by addressing the "Commissioner of Patents, Washington, D. C."